(12) United States Patent
Gits et al.

(10) Patent No.: US 9,401,871 B2
(45) Date of Patent: *Jul. 26, 2016

(54) RFID FOR AVAILABLE RESOURCES NOT CONNECTED TO THE NETWORK

(71) Applicant: Cisco Technology, Inc., San Jose, CA (US)

(72) Inventors: Peter M. Gits, Clarendon Hills, IL (US); Dale J. Seavey, Sunol, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,077

(22) Filed: Dec. 23, 2014

(65) Prior Publication Data
US 2015/0113139 A1 Apr. 23, 2015

Related U.S. Application Data

(63) Continuation of application No. 14/022,063, filed on Sep. 9, 2013, now Pat. No. 8,942,366, which is a continuation of application No. 11/191,519, filed on Jul. 27, 2005, now Pat. No. 8,537,997.

(51) Int. Cl.
*H04M 3/42* (2006.01)
*H04M 11/00* (2006.01)
(Continued)

(52) U.S. Cl.
CPC ............ *H04L 47/80* (2013.01); *H04L 12/1813* (2013.01); *H04L 12/581* (2013.01);
(Continued)

(58) Field of Classification Search
CPC .................. H04M 1/274575; H04M 1/72586; H04M 2203/60; H04M 2203/2072; H04M 2203/2094; H04M 2203/5054; H04M 2242/30; H04M 2250/62; H04M 3/42; H04M 3/4234; H04M 3/42221; H04M 3/42246; H04M 3/42348; H04M 3/42357; H04M 3/42374; H04M 3/4931; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04M 7/1235; H04L 12/18; H04L 12/1813; H04L 12/581; H04L 47/78; H04L 47/80; H04L 51/04; H04L 63/10; H04L 63/104; H04L 63/107; H04L 65/1053; H04L 65/403; H04L 67/18; H04L 67/24; H04W 12/08; H04W 4/02; H04W 4/06; H04W 4/08
USPC ................ 379/90.01, 93.01, 93.21, 157, 158, 379/201.01, 202.01, 207.01; 370/259, 260, 370/261, 262; 455/414.1, 416; 709/225
See application file for complete search history.

(56) References Cited

U.S. PATENT DOCUMENTS 6,694,351 B1 2/2004 Shaffer et al.
6,714,793 B1 3/2004 Carey et al.
(Continued)

OTHER PUBLICATIONS

Melnikov, Henry, "Open Solutions for Location Based Services in WLAN Environment" Apr. 6, 2003, Tampere University of Technology—Department of Information Technology.
(Continued)

*Primary Examiner* — Khai N Nguyen
(74) *Attorney, Agent, or Firm* — Polsinelli PC (57) ABSTRACT

Disclosed are apparatus and techniques for providing presence and location information from available media resources to participants in a media conference so that the participants can use then use such available resources in the conferencing interaction. When participating in such rich media conferences with presence and location capabilities, apparatus and techniques are provided for determining the device(s) being used and their capabilities and determining available resources presently connected to a network that is available to the participants and presenting such presence information to the conference participants. Additionally, apparatus and techniques are provided for obtaining presence and location knowledge of potential resources that are accessible but not connected to the network or shutdown and presenting such information to the participants. Thus, the participants can obtain presence and location information regarding accessible resources, including off-line or shutdown resources, and then use such information to enhance the conference in a number of ways.

18 Claims, 5 Drawing Sheets

(51) Int. Cl.
*H04M 1/00* (2006.01)
*H04L 12/16* (2006.01)
*H04Q 11/00* (2006.01)
*H04L 12/927* (2013.01)
*H04L 12/18* (2006.01)
*H04L 12/58* (2006.01)
*H04M 3/56* (2006.01)
*H04L 29/06* (2006.01)
*H04L 12/911* (2013.01)
*H04L 29/08* (2006.01)

(52) U.S. Cl.
CPC ............... *H04L 47/78* (2013.01); *H04L 51/04* (2013.01); *H04L 65/403* (2013.01); *H04L 67/18* (2013.01); *H04M 3/56* (2013.01); *H04M 3/563* (2013.01); *H04L 67/24* (2013.01); *H04M 3/42357* (2013.01); *H04M 3/42374* (2013.01); *H04M 2203/2094* (2013.01); *H04M 2242/30* (2013.01)

(56) References Cited

U.S. PATENT DOCUMENTS

| | | | |
|---|---|---|---|
| 6,807,565 | B1 | 10/2004 | Dodrill et al. |
| 7,085,258 | B2 | 8/2006 | Creamer et al. |
| 7,274,909 | B2 | 9/2007 | Pertilla et al. |
| 7,519,912 | B2 | 4/2009 | Moody et al. |
| 7,624,179 | B2 * | 11/2009 | Teodosiu ............... H04L 29/06 709/201 |
| 8,145,699 | B2 * | 3/2012 | Parham ................... H04L 29/06 709/202 |
| 8,238,536 | B1 | 8/2012 | Kavulak et al. |
| 2002/0049857 | A1 * | 4/2002 | Farber ..................... G06F 9/505 709/245 |
| 2002/0156892 | A1 * | 10/2002 | Karger .................. G06F 9/5027 709/225 |
| 2002/0161862 | A1 | 10/2002 | Horvitz |
| 2002/0184063 | A1 * | 12/2002 | Kaufman ............. G06Q 10/109 705/7.12 |
| 2003/0003933 | A1 | 1/2003 | Deshpande et al. |
| 2003/0016657 | A1 | 1/2003 | Creamer et al. |
| 2003/0022673 | A1 * | 1/2003 | Bantz ..................... H04L 69/329 455/456.1 |
| 2003/0023691 | A1 | 1/2003 | Knauerhase |
| 2003/0087632 | A1 | 5/2003 | Sagi et al. |
| 2003/0154293 | A1 | 8/2003 | Zmolek |
| 2003/0191836 | A1 * | 10/2003 | Murtha .................. H04L 67/02 709/224 |
| 2003/0220835 | A1 * | 11/2003 | Barnes, Jr. ......... G06Q 10/1053 705/14.36 |
| 2004/0015569 | A1 | 1/2004 | Lonnfors et al. |
| 2004/0088540 | A1 | 5/2004 | Marturano et al. |
| 2004/0125756 | A1 | 7/2004 | Lepore et al. |
| 2004/0130614 | A1 | 7/2004 | Valliath et al. |
| 2004/0152447 | A1 | 8/2004 | McDonnell et al. |
| 2004/0203350 | A1 | 10/2004 | Shultz et al. |
| 2004/0205775 | A1 | 10/2004 | Heikes et al. |
| 2004/0218749 | A1 | 11/2004 | Shaffer et al. |
| 2004/0225679 | A1 | 11/2004 | Oran |
| 2004/0259540 | A1 | 12/2004 | Banerjee et al. |
| 2005/0038876 | A1 | 2/2005 | Chaudhuri |
| 2005/0041603 | A1 | 2/2005 | Tighe et al. |
| 2005/0069104 | A1 | 3/2005 | Hanson et al. |
| 2005/0084086 | A1 | 4/2005 | Hesse |
| 2005/0085239 | A1 * | 4/2005 | Cedervall ............... H04W 64/00 455/456.1 |
| 2005/0125498 | A1 | 6/2005 | Frank et al. |
| 2005/0125541 | A1 | 6/2005 | Frank et al. |
| 2005/0138576 | A1 | 6/2005 | Baumert et al. |
| 2005/0141691 | A1 | 6/2005 | Wengrovitz |
| 2005/0141694 | A1 | 6/2005 | Wengrovitz |
| 2005/0165584 | A1 | 7/2005 | Boody et al. |
| 2005/0204310 | A1 | 9/2005 | De Zwart et al. |
| 2005/0227684 | A1 | 10/2005 | Niedermeier et al. |
| 2005/0233749 | A1 | 10/2005 | Karaoguz et al. |
| 2005/0249196 | A1 | 11/2005 | Ansari et al. |
| 2005/0254440 | A1 | 11/2005 | Sorrell |
| 2005/0278646 | A1 | 12/2005 | Liscano et al. |
| 2006/0031339 | A1 | 2/2006 | Peters |
| 2006/0041581 | A1 | 2/2006 | Aghvami et al. |
| 2006/0046709 | A1 * | 3/2006 | Krumm ............... H04N 21/4126 455/422.1 |
| 2006/0087554 | A1 | 4/2006 | Boyd et al. |
| 2006/0088004 | A1 * | 4/2006 | Casey ................... G01S 5/0294 370/329 |
| 2006/0104260 | A1 | 5/2006 | Croak et al. |
| 2006/0206586 | A1 * | 9/2006 | Ling ................... H04L 29/12113 709/219 |
| 2006/0285670 | A1 | 12/2006 | Chin et al. |
| 2007/0041366 | A1 | 2/2007 | Vugenfirer et al. |
| 2007/0140439 | A1 * | 6/2007 | Olrik .................... H04L 12/5895 379/67.1 |

OTHER PUBLICATIONS

J. Cuellar et al., "Geopriv Requirements" Feb. 2004, RFC 3693. © The Internet Society 2004.
J. Winterbottom et al., "GEOPRIV PIDF-LO Usage Clarification, Considerations and Recommendations" draft-ietf-geopriv-pidf-lo-profile-01.txt, Jul. 18, 2005, Internet-Draft. © the Internet Society 2005.
Ibach, Peter et al., "Dynamic Value Webs in Mobile Environments Using Adaptive Location-Based Services", Proceedings of the 38th Hawaii International Conference on System Sciences—2005. © 2005 IEEE.
M. Day et al., "A Model for Presence and Instant Messaging", Feb. 2000, RFC 2778. © The Internet Society 2000.
PanGo Networks, Inc.—Press Release, "PanGo Firstto Integrate Wi-Fi based Active RFID Product with Cisco's New Wireless Location Appliance" printed Jul. 26, 2005. http://www.pangonetworks.com/release 34.htm.

* cited by examiner

| Individual ID | Provisioned Component | Use Status | Last Use Status | Address |
|---|---|---|---|---|
| PersonC | Laptop | Off | 10:00 am | MAC_C |
| PersonC | cellphone | In use | now | ph#C |
| PersonA | desktop | On | 10:30 am | MACA |
| PersonA | conference | Using | now | conf_A |
| PersonA | cellphone | off | yesterday | PhA |
| PersonA | email | closed | 10:35 am | emailA |
| PersonA | IM | open | 10:15 am | IM_A |
| PersonB | cellphone | on | 10:15 am | Ph#B |
| PersonB | email | closed | 10:35 am | emailB |
| PersonB | IM | open | 10:15 am | IM_B |
| PersonB | conference | Using | now | conf_B |

206

Person_A Access Rights

| Provisioned Component/hotspot | Access Rights |
|---|---|
| Laptop | PersonB, PersonC |
| Conf. S/W | PersonB, PersonC |
| email | PersonB, PersonC |
| cellphone | Person_D |
| Conf. 110 | PersonB, PersonC |
| Office 116 | PersonB |

204

| HotSpot ID | Provisioned Component | Use Status | Last Use |
|---|---|---|---|
| Conf. 110 | IP phone 114b | Ready for use | 9:00 am |
| Conf. 110 | Projector 114a | Off | 9:15 am |
| Conf. 110 | whiteboard | In use | 10:30 am |
| Office 116 | Desktop | In Use | now |
| Office 116 | Conference S/W | Using | now |
| Office 116 | email | closed | 10:35 am |
| Office 116 | IM | open | 10:15 am |

208

PersonB Access Rights

| Provisioned Component/hotspot | Access Rights |
|---|---|
| desktop | PersonA, PersonB, PersonE |
| Conference S/W | PersonA, PersonB, PersonE |
| cellphone | PersonA, PersonB, PersonE |
| email | PersonA, PersonB, PersonE |
| IM | PersonA, PersonB, PersonE |
| conf. 110 | Everyone at Work |
| Office 116 | PersonE |

210

PersonC Access Rights

| Provisioned Component/hotspot | Access Rights |
|---|---|
| Laptop | Everyone at Work |
| Conf. S/W | PersonA, PersonB... |
| email | PersonA, PersonB... |
| cellphone | PersonF, PersonG |
| Conf. 110 | PersonA, PersonB... |

RFID FOR AVAILABLE RESOURCES NOT CONNECTED TO THE NETWORK

RELATED APPLICATIONS

This application is a continuation of U.S. patent application Ser. No. 14/022,063, entitled "RFID FOR AVAILABLE RESOURCES NOT CONNECTED TO THE NETWORK," filed on Sep. 9, 2012, now U.S. Pat. No. 8,942,366, which is a continuation of U.S. patent application Ser. No. 11/191,519, entitled "RFID FOR AVAILABLE RESOURCES NOT CONNECTED TO THE NETWORK," filed on Jul. 27, 2005, now U.S. Pat. No. 8,537,997, both of which are incorporated by reference in their entirety and for all purposes.

BACKGROUND OF THE INVENTION

The present invention relates to the general technology area of media conferencing. More specifically, it relates to optimizing media conferencing so that all available resources can be located and the most appropriate resource used during such conferencing.

Users of a computer network may communicate with each other using various devices, such as an IP (Internet Protocol) telephone or a soft IP phone integrated into a computer device, which are coupled with such network. In an example conferencing scenario, a voice-only conference is in progress between multiple participants over a network. There may be other media devices which are located proximate to one or more of the participants that would enhance the conference quality. For instance, video telephone devices may be positioned within three feet of each participant, and it would be desirable to escalate the conference by utilizing such video telephonic devices. However, these video devices may not be coupled to the network or not turned on and, therefore, not recognizable by the network. Thus, if the participants are not aware of all the media devices that are proximate to themselves or to each other, the participants cannot choose the best form of communication. In our example, the participants of the audio conference may not be aware of video devices that are proximate to them and, accordingly, will not choose to enhance the conference by using such video telephones.

There are numerous examples of conferencing situations in which it would be advantageous to detect which media resources were available with respect to individuals and the status of such resources so as to optimize or enhance ongoing or imminent conferencing interactions. Conventionally, if one wishes to contact another person during a ongoing teleconference, he may look up her telephone number in a directory and then attempt to reach her by placing a conferencing call to the obtained telephone number. If he is unable to reach the other person via their landline telephone, he may then look up her cellular phone number in his own personal directory or address book and attempt to conference her into the ongoing teleconference. Several different communication devices may be attempted before the other person is eventually reached. Needless to say, this process can use up significant amounts of time and be very frustrating to the caller.

In view of the above, there is a need for mechanisms for detecting the presences of available media resources that are presently connected to the network and their proximity to a participant or a particular area so as to use this information in a conferencing interaction. It is also desirable to detect media resources that are offline or powered down, which are proximate to a participant or a particular area, so as to use them in a conferencing interaction.

SUMMARY OF THE INVENTION

Accordingly, the present invention provides apparatus and techniques for providing presence and location information from available media resources to participants in a media conference so that the participants can use such available resources in the conferencing interaction. When participating in such rich media conferences with presence and location capabilities, apparatus and techniques are provided for determining the device(s) being used and their capabilities and determining available resources presently connected to a network that is available to the participants and presenting such presence information to the conference participants. Additionally, apparatus and techniques are provided for obtaining presence and location knowledge of potential resources that are accessible but not connected to the network or shutdown and presenting such information to the participants. Thus, the participants can obtain presence and location information regarding accessible resources, including off-line or shutdown resources, and then use such information to enhance the conference in a number of ways.

In one embodiment, a method of facilitating a conference between a plurality of participants is provided. When a request for information regarding a particular participant is received from a requesting participant, status information is provided for one or more owned resources that are provisioned to the particular participant or in-use by the particular participant. When a request for information regarding other resources that are available for use by the particular participant is received from the requesting participant, status and location information is provided for available resources that are proximate to the particular participant regardless of whether the available resources are off-line or shutdown so as to allow enhancement of the conference.

In a specific implementation, a particular available resource is proximate to the particular participant when the particular available resource is in a same geographical hot spot as the particular participant or within a predetermined distance from the particular participant. In a further aspect, the hot spot is selected from a group consisting of a specific room of a building, a specific floor of a building, and a particular building. In another specific implementation, each resource is in the form of one or more of the following components: an IM (instant messaging) application, an email application, a conferencing or meeting application, a soft IP (Internet Protocol) telephone, a physical voice or video IP telephone, a cellular telephone, a PDA (personal digital assistant), and a computer device such as a desktop or laptop computer. In another embodiment, the provided location information for one of the available resources includes a location of a badge of the particular participant.

In a specific aspect, location information of at least one of the available resource originates from a location mechanism integrated with the at least one available resource. In one implementation, the location mechanism includes a RFID (radio frequency identifier). In another implementation, the RFID is read by an RFID reader or transmitted via a wireless local area network (WLAN) protocol. In another implementation, the location mechanism includes a GPS (global position system) or AGPS (assisted GPS) receiver.

In another embodiment aspect, the provided status information of the available resources specifies one or more of the following values: on, off, in use, open, closed, online, offline, use duration, last use timestamp, location of resource, an identifier of the particular participant, a resource's identifier, a hotspot identifier, a communication type that can be used to identify a particular application, and an address for specifying a way to contact the corresponding resource or particular participant. In a specific aspect, the status information is obtained from one or more presence aggregation server(s) that collect status information regarding a plurality of resources and the location information is obtained from one or more location server(s) that collect location information from a plurality of resources. In anther aspect, the status and location information of each resource is only provided when the requesting participant is authorized to access information from such each resource. In a further use embodiment, the conference is escalated based on the provided status and location information of available resources.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the present invention combines presence and location information regarding resource that are owned, provisioned to, or being used by one or more participants in a conference with presence and location information regarding resources that are not owned, provisioned, in-use, or on a network to facilitate or optimize conferencing with these participants. A resource is generally defined as any hardware and/or software component or device that can be utilized in an audio or visual conference by a participant. By way of examples, resources include IM (instant messaging) applications, email applications, conferencing or meeting applications, soft IP (Internet Protocol) telephones, physical voice or video IP telephones, voice or video cellular telephones, PDA's (personal digital assistants), wireless and hardwired computer devices such as laptops and desktop computers, etc.

The term "presence" generally refers to various status and location information regarding a participant's various owned/ provisioned resources, such as a participant's email and IM (instant messaging) status. For example, presence for PersonX may include status information that indicates that PersonX has an open inbox for his/her associated IM persona. In embodiments of the present invention, presence information of various resources that are owned by (or provisioned to) or used by an individual are tracked.

The presence information for an individual may be combined with an individual's current location and information about resources that are found to be proximate to the individual's current location, and this combined information may then be used together for conferencing in various ways. In a first example, a person is wearing an RFID (radio frequency identification) badge whose location is being tracked throughout his office buildings with respect to certain hot spots. A hot spot is generally defined as a specific area, such as a room or floor of a building, whose proximity relation to resources and individuals may be determined and provided during a conferencing interaction. Thus, a person's location can be determined with respect to his badge position and whether the badge has entered or exited a hot spot. In a second example, the individual is tracked by other location mechanisms implemented within his personal communication devices, such as using GPS (global positioning system) or AGPS (assisted GPS) on the individual's cell phone. Having knowledge of a person's presence status and location allows such person to be easily located for a conference.

When an individual's location information is used in conjunction with the presence information (e.g., from a Presence Aggregation Server or PAS), one can then be made aware of available or provisioned components that have no relationship other than proximity to a user. That is, the location and status of resources that are merely proximate to an individual may also be determined in relation to such individual's location and presence. The location of resources that are not coupled to the network or turned off may be determined using any suitable location mechanism, such as any combination of GPS, AGPS, WLAN (wireless LAN), and RFID to obtain each resource's location and then collect the information on one or more accessible servers, such as one or more location servers. A suitable component that includes RFID and WLAN capabilities is the PanGo Locator available from PanGo Networks, Inc. of Framingham, Mass.

In sum, an individual's presence and location and the location and status of his available resources may be combined and presented during a conference. In an example use of this combined information, a person conferencing with a second and third person can be aware that the second person is not using an attribute that the others within the conference are using, such as a video phone. The first person can then suggest to this second person that he may want to "upgrade" his capabilities by walking over 20 feet to an available and unused component such as a video phone.

In other words, presence and location information regarding an individual and her available resources are presented to a user during a conference so as to suggest solutions to the user based on what current conference call attributes are being utilized by the meeting participants. This is not limited to a video phone, but could be as simple as a "shared white board" that provides the user the ability to write something to a shared white board so that the other participants can see her input to the white board. Visibility into what components are where and within the "context" of the existing conference call is provided. This visibility can suggest new possibilities for the ongoing or about-to-be initiated conference. This "awareness" of location of both the user and components on and off the network combined with the "awareness" of participants in an ongoing conference allows alternatives for enhancing the conference that were never conceived by the participants to be presented and then used by the participants in real time.

Figure 1:
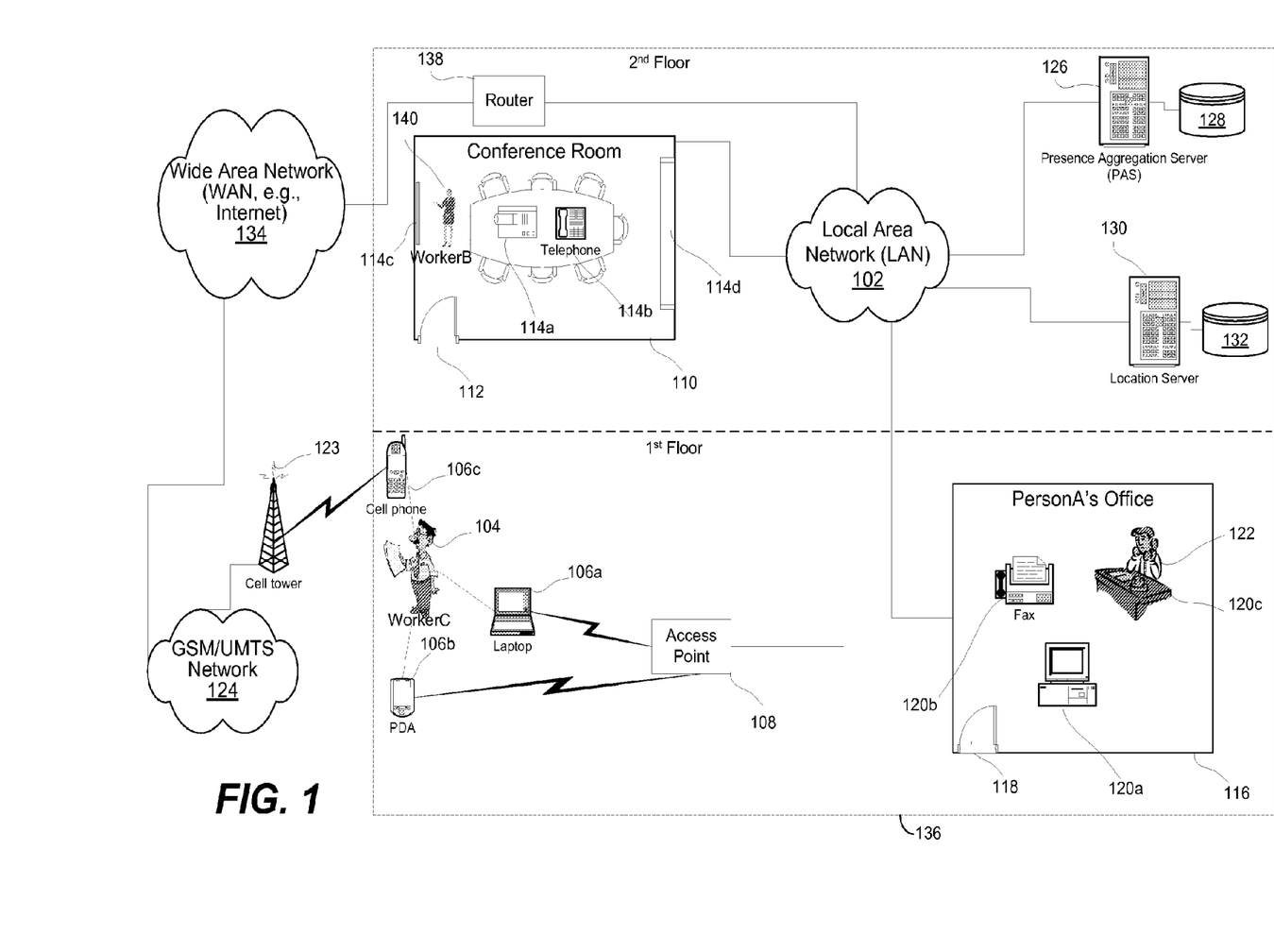
FIG. 1 is a diagrammatic representation of a network segment in which embodiments of the present invention may be implemented.

FIG. 1 is a diagrammatic representation of a network segment in which embodiments of the present invention may be implemented. This diagram generally illustrates different types of presence information and resources that can be tracked and utilized. This network is merely meant to serve as an example is not meant to limit the scope of the invention. For example, various specific components are shown in FIG. 1 and described as implementing a particular function. However, the various techniques of the present invention may be implemented in any suitable type and number of devices (hardware and/or software).

As shown, a portion of the network is within an office building 136. The building 136 includes a first floor and a second floor. As shown the first floor of building 136 includes an office 116 for PersonA and the second floor of building 136 includes conference room 110. Different areas of the building may be defined as hot spots for tracking purposes. In the illustrated example, the entire first floor, the entire second floor, the building itself, conference room 110, and the office 116 of PersonA may be defined as different hotspots. Any geographical area may be defined as a hotspot, such as a person's home and automobile, different office buildings and rooms, etc.

In this example, the building 136 also includes a local area network (LAN) 102. The LAN 102 is coupled to a presence aggregation server (PAS) 126 which is coupled to one or more database 128. The PAS 126 tracks each individual's provisioned or owned resources and their corresponding status information. The status information may indicate a resource's use in different ways, as well as address information (if relevant) that corresponds to an identifier of the resource that one can use to initiate communication with an individual through such resource. The PAS may also be used to track each hotspot's provisioned resources and their status and address information.

A location server 130 may also be coupled to LAN 102, as well as one or more database 132. Typically, a LAN will include multiple distributed location servers that are accessible by an authorized entity. In general, the location server is a repository of the current locations of various resources and individuals. The location information may take any suitable form, such as absolute position, relative position with respect to a hotspot, relative position with respect to a building plan or a map, and be obtained by any suitable location mechanism. Current location information may be sent by each resource to the location server. Alternatively, a resource may be polled to obtain the location information. Status information of each resource may also be automatically sent to the location server 130 (or PAS 126) via LAN 102 or via wireless transmission if such resource is physically decoupled from the LAN 102.

Hotspots may be defined in any suitable manner. For example, hotspots may be defined and preconfigured in both the location server 130 and the PAS 130 or accessible on any suitable server. Alternatively, the hotspots may be programmable on the location server 130 and/or PAS, or any other accessible server, by authorized individuals. For example, a resource's owner may only be allowed set up access rights regarding the tracking of such resource with respect to hotspots.

Various types of resources and individuals and their location and status may be tracked with embodiments of the present invention. The PAS may be adapted to collect status information regarding resources that are provisioned to each hotspot. As shown, the conference room 110 contains provisioned resources in the form of an IP telephone 114*b*, a projector 114*a*, a screen 114*d* for the projector, and a whiteboard 114*c*. These resources 114 can be defined as being provisioned to any combination of the conference room 110, the second floor, and building 136. These resources may operate to transmit their status and association with any of their hotspots via any suitable mechanism to PAS 126, such as wireless LAN (WLAN) or a direct connection to the LAN 102.

On the first floor of building 136 is an office 116 of PersonA 122. The office 116 and/or PersonA 122 may also have any number of provisioned or owned resources, such as fax 120*b*, desktop 120*a*, and telephone 120*a*. Each resource of office 116 or PersonA 122 may also operate to transmit their status in relation to their associated hotspot to PAS 126.

A fixed position resource can be permanently associated with a particular hotspot and this association may be preconfigured in the PAS. Thus, provisioned and static resources only need to be adapted to transmit their status to the PAS and not their location or whether they are located within a particular hotspot. Alternatively, the location information of even fixed position resources may be sent to the PAS, along with its status information, and the PAS then determines which hotspot to associate with the resource based on its location and known hotspot locations. The location information regarding the resource may also be sent to the location server and then obtained by the PAS so as to associate the resource with a particular hotspot. The status of mobile resources, such as video conferencing equipment on a cart, in relationship to hotspots may be tracked in a similar manner.

The status and location of various mobile resources (provisioned or not) is also tracked. In one implementation, each resource includes an RFID tag, and multiple RFID readers are positioned at entrances to various hotspots. For instance, an RFID reader may be placed at entry 112 of conference room 110 and another RFID reader placed at the entrance 118 of office 116. As resources enter and exit a hotspot, the RFID reader scans the resource. The RFID readers are coupled to the LAN 102 so as to transmit which resources have left or entered a hotspot.

In another implementation, a resource may be configured with a WLAN protocol, such as 802.11. The building 136 may include a number of access points to which the WLAN of each resource may transmit its status information. The location of each resource may be determined by any suitable location technique, such as triangulation with a plurality of access points. A resource may also include an RFID that is configured to transmit wirelessly to the nearest access points. A resource may alternatively include a GPS or AGPS for transmitting location, along with its status information to the LAN 102. The location information may be stored in the PAS and/or location server in various manners as further described below.

As shown, the first floor includes access point 108. Resources having a location mechanism and wireless protocol interface and that move to a position that is proximate to access point 108 transmit their status and, in effect, location to location server 130 and/or PAS 126. As shown, laptop 106*a*, PDA 106*b*, and cell phone 106*c* of individual 104 transmit their location and status to access point 108, which then sends this information to location server 130 and/or PAS 126 via LAN 102. Each person may also have a badge containing a transmitting location device, such as an RFID combined with 802.11 LAN transmission protocol, so as to transmit the badge's location to the PAS and/or location server.

The PAS 126 and location server 130 may also have access to resources outside its LAN 102. That is, these servers may have access to other networks that provide status and/or location information regarding resources, such as wide area network 134 or GSM or UMTS (Universal Mobile Telecommunications System) network 124, which is typically used for cellular telephone transmission. Other types of networks may include other LAN's, external location servers or PAS's, the PTSN (Public Switched Telephone Network), a telecommunication proxy server, SIP proxy server, TCP/IP networks (e.g., detecting network activity of a MAC address), calendar systems such as Exchange and Mozilla Sun Bird, Bluetooth networks, ad hoc networks, etc.

Referring back to FIG. 1, cell phone 106*c* may include a GPS receiver which works in conjunction with cell phone tower 123 and GSM/UMTS network 124 to transmit its location and status through such networks to the PAS 126 and/or location server 130 of LAN 102. More specifically, the cell phone may utilize AGPS which works in conjunction with GSM/UMTS to obtain the cell phones current location. This current location may be transmitted through any suitable networks, such as GSM/UMTS network 124, WAN 134, and LAN 102 to a location server 130 and/or PAS 126. Any suitable number of routers or network devices may be positioned between the various networks for routing data and formatting data between such networks, such as router 138.

Figure 2A:
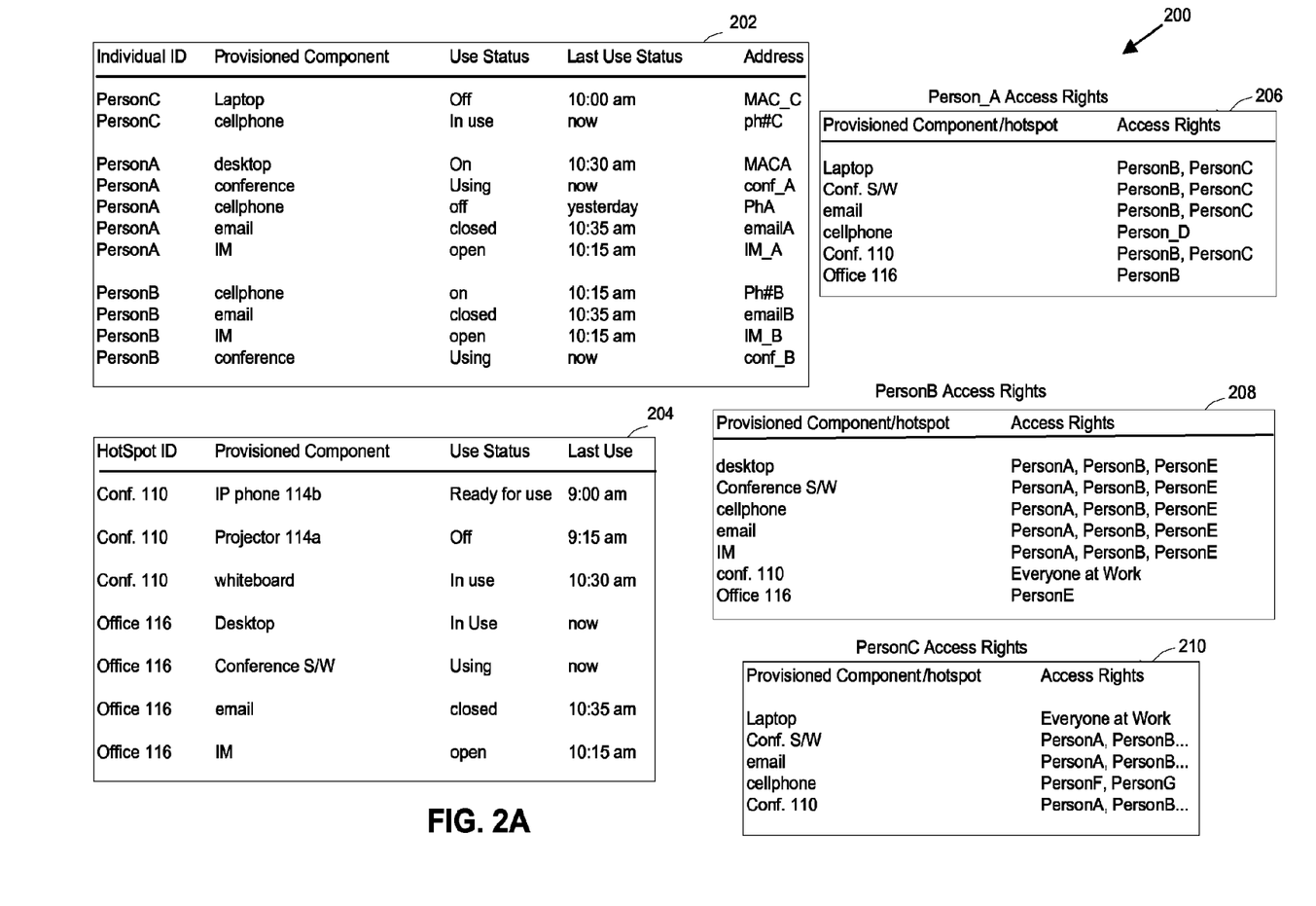
FIG. 2A includes various data structures of a presence aggregation server (PAS) in accordance with one implementation of the present invention.

The PAS 126 may include any suitable data structures for tracking individuals, their provisioned resources, resources that are coupled to the network, resources that are not coupled to the network, the individual's and each resource's location with respect to various hotspots, as well as the status of the various resources. FIG. 2 includes various data structures 200 of the PAS 126 of FIG. 1 in accordance with one implementation of the present invention. The following example data structures are merely illustrative and not meant to limit the scope of the invention. Several suitable data formats are described in the document entitled "A Model for Presence and Instant Messaging" having RFC No. 2778 by M. Day et al., IETF (February 2000), which document is incorporated herein by reference in its entirety. In this implementation, each presence data element (for a resource) includes a status field having multiple values that can be used to store various status types, such as on, off, in use, open, closed, online, offline, use duration, last use timestamp, location of resource, an individual's identifier, a resource's identifier, a hotspot identifier, etc., a communication means field that can be used to identify a particular application such as email or IM, and a contact field for storing a way to contact the resource or individual, such as an email address, IM identity, or phone number.

In the illustrated implementation, the data structures of the PAS may include an individual table 202 for listing each person's provisioned resources, the use status of each resource, a time stamp of when each resource's was last used, and an address for each resource. This table may also include a location of each resource (not shown), as opposed to or in addition to storing such information in the location server 130. Other suitable status indicators, such as those listed above with respect to RFC 2778 may also be listed. This individual table 202 shows PersonC as being provisioned with a laptop that is currently off and has been used last at 10:00 am and has a specified MAC address "MACA. This PersonB is also shown as being provisioned with a cell phone that is currently in use and has phone number "Ph#B". This table 202 also shows PersonA as being provisioned with a desktop, a conference application, cell phone, an email application, and an instant messaging application. A use status, last use, and address field are also presented for each provisioned resource of PersonC. PersonB is shown as having provisioned resources in the form of a cellphone, email application, IM application, and conference application, as well as showing their status, last use time, and address.

A hotspot table 204 lists hotspots and their provisioned resources, as well as their status and last use. This table may also include an address for each resource (not shown). For example, conference room 110 of FIG. 1 includes an IP phone 114*b* which is ready for use and was last used at 9:00 am. Table 204 also shows the office 116 of FIG. 1 as including provisioned resources: a desktop, conference software, email, and instant messaging, as well their various status and last use times.

The data structures of the PAS may also include data structures for access rights for various individuals with respect to resources of a particular individual. The access rights may simply be a list of persons that are allowed to access presence and/or location information regarding the provisioned resources of a particular person. The access rights may also specify who can have knowledge of a person's position with respect to various hotspots. As shown, data structure 206 lists the provisioned resources of PersonA and possible hotspots that PersonA may move with respect to and the resource access rights for such provisioned resources and hotspots. As shown, PersonB and PersonC have access rights to provisioned laptop, conference application, email, and conference room 110 with respect to PersonA. In other words, PersonB may know whether PersonA has entered or exited conference room 110 and know the status (use and/or location) of PersonA's laptop, conference application, and email application. In contrast, only PersonD may access the status of PersonA's cell phone. For example, PersonA may only wish to give access to his or her spouse for her cell phone status. As shown, PersonB only has access to PersonA's status or location with respect to the office 116 of PersonA. This table 206 may identify each resource by any suitable mechanism, such as MAC address, serial number, etc.

Table 208 lists PersonB's access rights to others with respect to various provisioned resources and hotspots, and table 210 lists PersonC's access rights to others with respect to various provisioned resources and hotspots. The access rights may allow a particular group, as opposed to one or more individuals, access to presence or location information with respect to resources or hotspots. As shown, everyone at PersonB's work is allowed access to his status with respect to conference room 110, e.g., whether PersonB has entered or exited conference room 110.

Figure 2B:
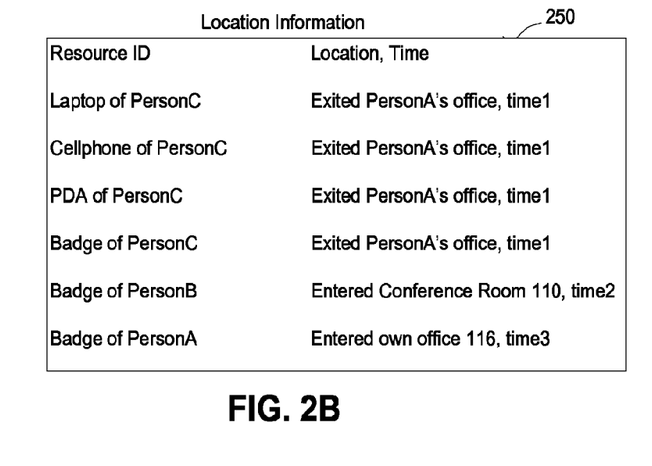
FIG. 2B is an example database for use with a location server in accordance with one embodiment of the present invention.

FIG. 2B is an example database for use with the location server 130 of FIG. 1 in accordance with one embodiment of the present invention. As shown, the data structure 250 includes a plurality of entries that each have a resource identity field for specifying the particular resource, a location field for specifying a current location of the particular resource, and a time stamp field for indicating the time of the last change in location. The location field may specify entry to or exit from a particular hotspot. For example, the laptop, cellphone, PDA, and badge of PersonC is specified as exiting the office of PersonA at time1. Likewise, the badge of PersonB is specified as entering conference room 110 at time2. The badge of PersonA is shown as entering his own office 116 at time3.

Figure 3:
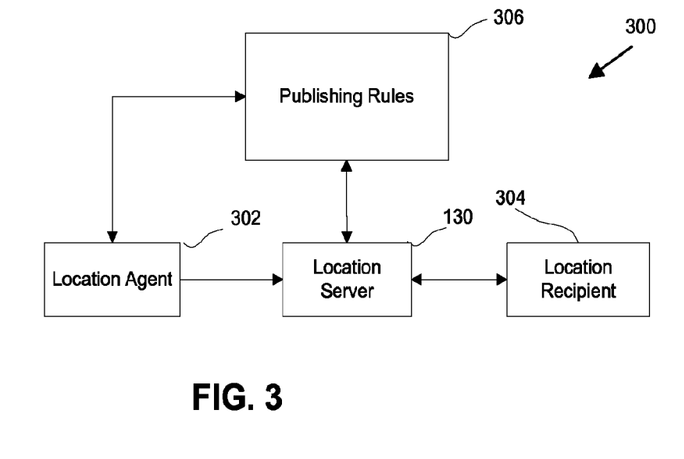
FIG. 3 is a block diagram of a location system in accordance with one implementation of the present invention.

FIG. 3 is a block diagram of a location system 300 in accordance with one implementation of the present invention. As shown, a location agent 302 may be configured to push location data of a particular resource to location server 130. The agent 302 may also push status information regarding the particular resource to the location server 130. Alternatively, the status information and/or location data may be sent to a PAS.

The location agent 302 may be in the form of a software module that is configured in a particular resource, such as a laptop or cell phone. The location agent obtains the location data (and status information) from its resource and sends it to the location server 130. The location server 130 may be configured to receive location data from one or more agents and then publish this location data to a location recipient 304.

The location recipient 304 may be in the form of any suitable entity that is configured to receive location data from the location server, such as the presence server 126 of FIG. 1. The PAS 126 may then publish this location information, along with presence information, to conference participants who request information regarding a particular individual and their available resources. In one implementation, the location and presence data is sent to a participant when they make a request through a specially configured conferencing application as described further below. Alternatively, the location data may be received directly by the conference participants when requested, instead of passing through a PAS.

The location server 130 and/or the location agent 302 may be constrained in their distribution of location data by publishing rules 306. The publishing rules may be set up by the owner of the particular resource, and these rules may specify who or what entity is authorized (or prevented) to receive publication of the particular resource's location and status information. In one implementation, one or more users are authorized per each resource MAC address. That is, a resource is identified by a MAC address (or any other suitable identifier) and this identifier is associated with a list of users that may receive location (and status) information regarding the corresponding resource. For example, if the publishing rules dictate that the location agent cannot send location or status information from the particular resource to anyone, the location agent is prevented from doing so. By way of another example, if the publishing rules specify that only PersonA is authorized to receive the location data from resouceA, the location server publishes the location data from the particular resource only to PersonA. In a preferred embodiment, the publishing rules are only used with a location server to completely prevent the location data of a particular resource from being sent to anyone in certain privacy situations. That is, the publishing rules are only used with a location server to completely block access to location data from a particular resource.

Figure 4:
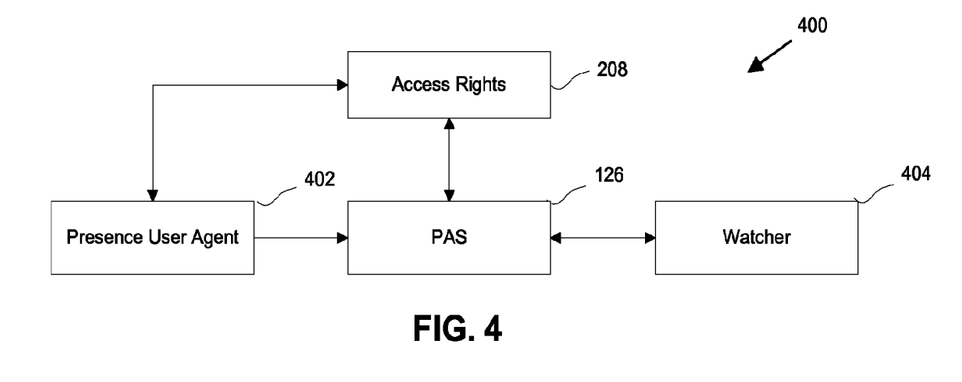
FIG. 4 is a diagrammatic representation of a presence system in accordance with one embodiment of the present invention.

For resource's that are set up to allow location data publication to some entities and prevent publication to other entities, the PAS recipient is then used to provide a more customized filter of published location and/or status information regarding particular resources and individuals. FIG. 4 is a diagrammatic representation of a presence system 400 in accordance with one embodiment of the present invention. As shown, a presence user agent 402 collects presence information from various resources that are owned/provisioned to particular individuals or hotspots, and this presence information is sent to PAS 126. As described above, presence information may include various status information about a particular individual or hotspot's provisioned resource. The presence user agent 402 may be configured in a particular resource, such as a laptop or PDA.

The PAS is operable to publish presence and/or location information for one or more resources to one or more watchers 404 that are authorized to receive such information. In one example, the publishing rules may be set up by an individual to completely block transmission of a resource's presence or location information. Access rights 208 may also be set up to specify which information may be published from the PAS to which entities or watchers. In a specific implementation, the access rights 208 may dictate to the PAS 126 that particular resource information may only be published to specific watchers 404.

Figure 5:
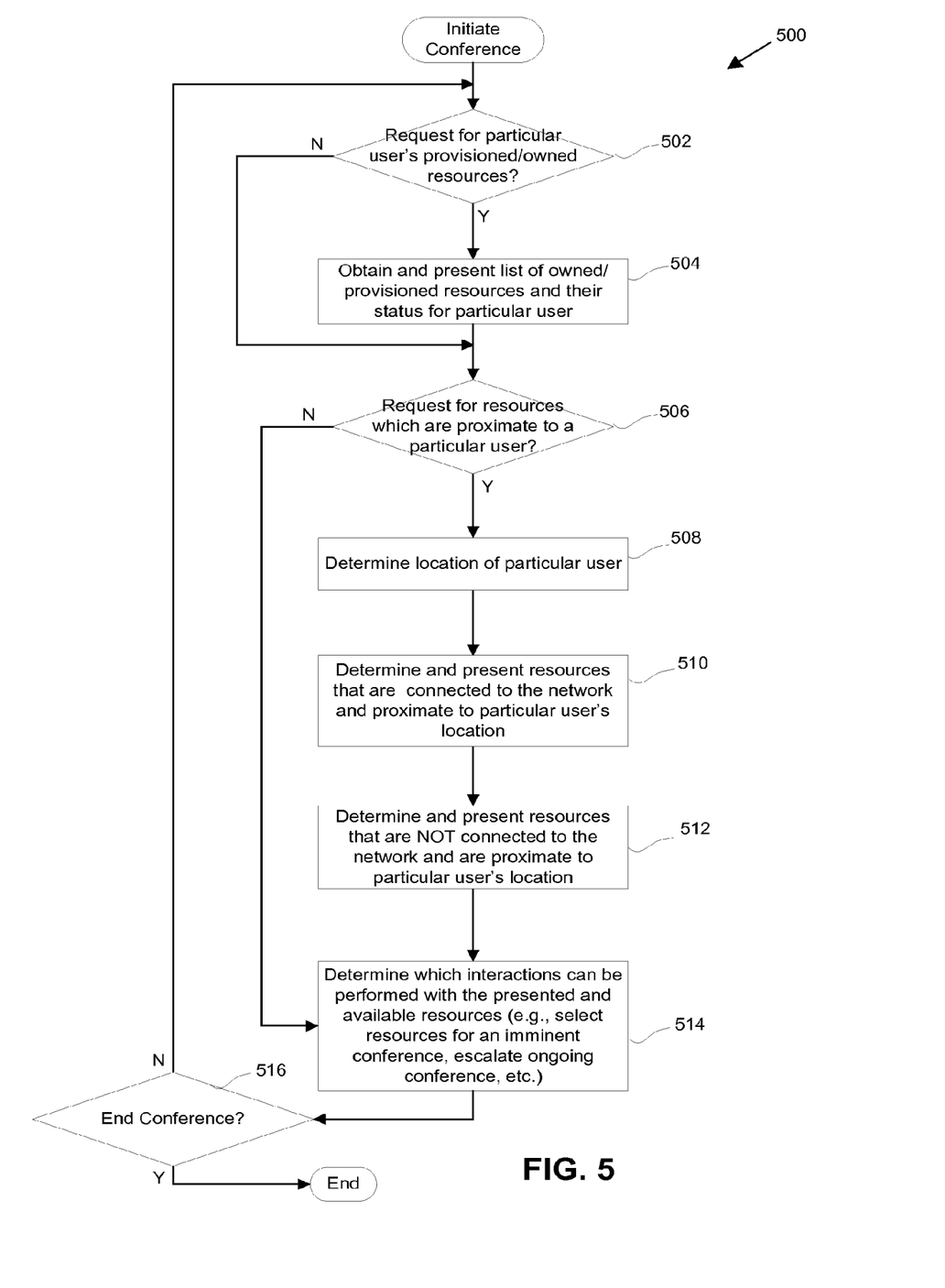
FIG. 5 is a flowchart illustrating a procedure for providing and using presence and location information for available resources in a conferencing interaction in accordance with one embodiment of the present invention.

FIG. 5 is a flowchart illustrating a procedure 500 for providing and using presence and location information of available resources in a conferencing interaction in accordance with one embodiment of the present invention. This procedure 500 may be implemented, for example, when a conference is initiated via a conferencing software entity. For instance, a conferencing application may be modified to implement procedures for providing presence and location data upon startup of the conferencing application. That is, embodiments of the present invention may be provided as a layer on top of the conferencing software application. Examples of suitable conferencing applications include MeetingPlace software available from Cisco of San Jose, Calif. and Macromedia Breeze Conference Service available from Adobe of San Jose, Calif.

Referring back to FIG. 5, it is initially determined whether a request has been made for a particular user's provisioned or owned resources in operation 502. For example, when a conference call is set up between a group of participants and when one of the participants joins the conference, a graphical user interface (GUI) may be presented to the joining participant that lists the other participants (who have joined or not yet joined the conference). The joining participant may then select a particular participant via any suitable input mechanism, e.g., by hitting a radio button next to the participant's name or typing in the participants name in a "user selection" input box on the GUI.

If a request for a particular user's information has been made by a selecting participant, a list of resources and their status that are provisioned to the particular user are then obtained and presented in operation 504. Otherwise this step is skipped. In one implementation, a request by the selecting participant for the particular user's presence information is then sent to the PAS. The PAS responds with presence and/or location information for resources provisioned to the particular participant if the selecting participant is authorized to receive such information. Otherwise, an "access denied" message may be displayed if the requesting user does not have access rights. If some of the selected participant's resource information is authorized for publication to the requesting participant, then presence or location information is published for only these authorized resources. In an alternative embodiment, the selecting participant is simply not presented with unauthorized choices. For example, the selecting participant is only shown a list of individuals and resources to which he has presence access rights.

It is then determined whether a request for resources which are proximate to a particular user has been made in operation 506. The request may be accomplished in any suitable manner, such as selecting a GUI input option for the particular participant. If such a request has been made, the location of a particular user is determined in operation 508. For example, it may be determined whether the particular user's badge or provisioned resources have recently been noted as entering or exiting a hotspot by obtaining location information regarding the particular user's badge or provisioned resources from the location server. Alternatively, an absolute location of the user's badge or provisioned resources may be obtained. Some of the user's resources may not be on the user's person, and, accordingly, the user's location may be determined by intelligently assessing the user's provisioned resources and their latest status to determine the user's most likely location. For example, if the user used their laptop in the last 5 minutes, the user's location may be presumed to match the laptop's location. This determination of most likely location may be determined automatically by the PAS or conferencing software or manually by the requesting participant based on the presented presence and location information.

It is then determined which resources that are connected to the network are proximate to the particular user's location, and the presence information of the proximate, connected resources is presented as being proximate to the selected user in operation 510. It is also determined which resources that are not connected to the network are proximate to the particular user's location, and these resources and their presence information are also presented to the selecting participant in operation 512. If such a request for proximate resources is not made, operations 508 through 512 may be skipped.

The proximate resources and their presence information may be obtained in any suitable manner. For example, resources that are in a hotspot that the selected user is occupying may be presented. Alternatively, the resources that are in the hotspot that is most proximate to the selected user may be presented. In another implementation, the resources that have a location that is within a predetermined distance of the user may be presented. The exact determination of proximity may be selectable or preconfigured using any suitable metric.

In further examples, a selecting participant may also select wider degrees of proximity for a particular user. For example, the requesting participant may first ask for resources that are within 5 meters of the selected participant; then ask for resources that are in the same hotspot as the selected participant; and then resources that are on the same floor as the selected participant, etc. In another example, the selected participant may be mobile and it may be determined what remote resources are within a predetermined distance to the participant. For instance, the nearest WLAN site may be accessed from a WLAN server and presented to the requesting participant.

The publication of any proximity degree of resource presence and location information may be limited by the publishing access rights as described above. That is, presence and location information is published only to requesting participants who have access rights to such information.

It may then be determined which interactions can be performed with the presented and available resources in operation 514. These interactions may then be executed. It is then determined whether the end of conference has occurred in operation 516. If it has, the procedure 500 ends. If it has not ended yet, the procedure 500 is repeated.

Any suitable interaction may occur using the presented presence and location information with respect to a conference (or potential) participant. For example, a participant who has knowledge of resource status and location information of resources provisioned and near a particular participant may then determine whether a conference can be escalated from voice to video media resources, or from using a cellular telephone to using a proximate computer device, based on whether the particular participant has access to such resources. If a particular user wishes to send data to another user, it may first be determined what resources are near the receiving user and then which of these available resources is the most reliable or efficient resource for sending data. For instance, the receiving user may be proximate to both a desktop computer device for receiving email via a cable modem and a PDA that implements wireless email. In this case, the desktop computer would be chosen for both speed and reliability considerations.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 6:
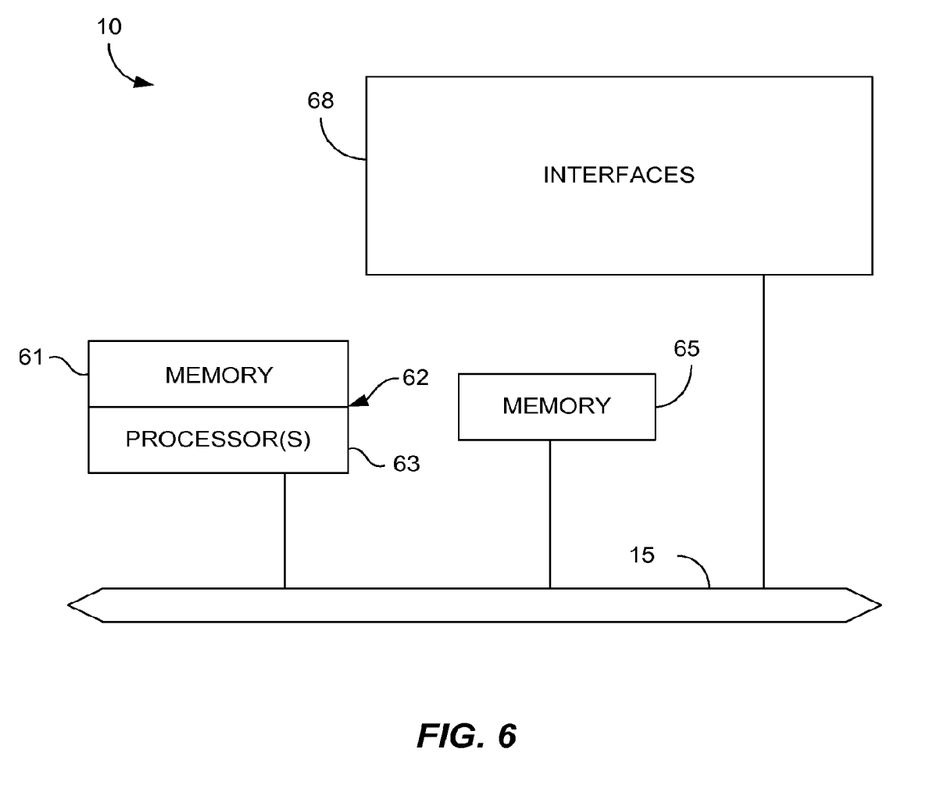
FIG. 6 is a diagrammatic representation of a computer system in which some of the techniques of the present invention may be implemented.

Referring now to FIG. 6, a computer system 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such computer system tasks as computations and application management. It preferably accomplishes all these functions under the control of software including an operating system and any appropriate applications software. CPU 62 may include one or more processors 63 such as a processor from the Motorola family of microprocessors or the MIPS family of microprocessors. In an alternative embodiment, processor 63 is specially designed hardware for controlling the operations of computer system 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the computer system 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media.

Although the system shown in FIG. 6 is one specific computer system of the present invention, it is by no means the only computer system architecture on which the present invention can be implemented. Regardless of a computer system's configuration, it may employ one or more memories or memory modules (such as, for example, memory block 65) configured to store data, program instructions for the general-purpose processing operations and/or the inventive techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method comprising:
   receiving, at a location server, resource information from a location agent, the resource information being associated with a resource, the resource information comprising location data of the resource and status information of the resource, wherein the location agent is configured in the resource to push the resource information to the location server;
   receiving, from a requesting entity, a request to access the resource information;
   determining, based on the location data and the status information, whether the requesting entity is entitled to access the resource, to yield an accessibility information; and
   publishing the accessibility information to the requesting entity, wherein the location server is configured to receive additional resource information from one or more location agents and publish the additional resource information to the requesting entity.

2. The method of claim 1, wherein the resource information further comprises at least one of a resource type, availability, a last use status, an access right, or an address, associated with the resource.

3. The method of claim 2, wherein determining whether the requesting entity is entitled to access the resource is based on the access right of the requesting entity.

4. The method of claim 1, further comprising:
   receiving, from the requesting entity, an indication of a selected resource from one or more resources; and
   allowing the requesting entity to use the selected resource.

5. The method of claim 1, wherein the location agent is associated with a user, and wherein the user and the requesting entity are participants in a conference.

6. The method of claim 1, wherein the location agent is a software module configured in the resource.

7. The method of claim 1, wherein the resource is at least one of a phone, a cellphone, a laptop computer, a desktop computer, a conference device, an email device, an instant messaging device, a white board, or a projector.

8. A location server comprising:
   a computer processor; and
   a non-transitory computer-readable storage medium storing instructions which, when executed by the computer processor, cause the location server to perform operations comprising:
   receiving resource information from a location agent, the resource information being associated with a resource, the resource information comprising location data of the resource and status information of the resource, wherein the location agent is configured in the resource to push the resource information to the location server;
   receiving, from a requesting entity, a request to access the resource information;
   determining, based on the location data and the status information, whether the requesting entity is entitled to access the resource, to yield accessibility information; and
   publishing the accessibility information to the requesting entity, wherein the location server is configured to receive additional resource information from one or more location agents and publish the additional resource information to the requesting entity.

9. The location server of claim 8, wherein the resource information further comprises at least one of a resource type, availability, a last use status, an access right, or an address, associated with the resource.

10. The location server of claim 9, wherein determining whether the requesting entity is entitled to access the resource is based on the access right of the requesting entity.

11. The location server of claim 8, the non-transitory computer-readable storage medium storing additional instructions which, when executed by the computer processor, cause the location server to perform further operations comprising:
    receiving, from the requesting entity, an indication of a selected resource from one or more resources; and
    allowing the requesting entity to use the selected resource.

12. The location server of claim 8, wherein the location agent is associated with a user, and wherein the user and the requesting entity are participants in a conference.

13. The location server of claim 8, wherein the location agent is a software module configured in the resource.

14. The location server of claim 8, wherein the resource is at least one of a phone, a cellphone, a laptop computer, a desktop computer, a conference device, an email device, an instant messaging device, a white board, or a projector.

15. A non-transitory computer-readable storage device storing instructions which, when executed by a location server, cause the location server to perform operations comprising:
    receiving resource information from a location agent, the resource information being associated with a resource, the resource information comprising location data of the resource and status information of the resource, wherein the location agent is configured in the resource to push the resource information to the location server;

receiving, from a requesting entity, a request to access the resource information;

determining, based on the location data and the status information, whether the requesting entity is entitled to access the resource, to yield an accessibility information; and publishing the accessibility information to the requesting entity, wherein the location server is configured to receive additional resource information from one or more location agents and publish the additional resource information to the requesting entity.

16. The non-transitory computer-readable storage device of claim 15, storing additional instructions which, when executed by the location server, cause the location server to perform further operations comprising:

receiving, from the requesting entity, an indication of a selected resource from one or more resources; and allowing the requesting entity to use the selected resource.

17. The non-transitory computer-readable storage device of claim 15, wherein the location agent is associated with a user, and wherein the user and the requesting entity are participants in a conference.

18. The non-transitory computer-readable storage device of claim 15, wherein the resource is at least one of a phone, a cellphone, a laptop computer, a desktop computer, a conference device, an email device, an instant messaging device, a white board, or a projector.

* * * * *